United States Patent [19]

Schneider

[11] Patent Number: 5,264,825
[45] Date of Patent: Nov. 23, 1993

[54] COMBINED SWITCH AND INDICATOR LIGHT FOR ELECTRONIC VEHICLE SECURITY SYSTEM

[75] Inventor: Jack H. Schneider, Coral Springs, Fla.

[73] Assignee: Rostra Precision Controls, Inc., Laurinburg, N.C.

[21] Appl. No.: 918,919

[22] Filed: Jul. 23, 1992

Related U.S. Application Data

[63] Continuation of Ser. No. 669,364, Mar. 14, 1991, abandoned.

[51] Int. Cl.⁵ .............................................. B60R 25/10
[52] U.S. Cl. .................................. 340/426; 340/691; 340/815.13; 340/815.15; 307/10.2
[58] Field of Search ............... 340/691, 426, 815.13, 340/815.15-815.2; 307/10.2

[56] References Cited

U.S. PATENT DOCUMENTS

| | | |
|---|---|---|
| 506,729 | 10/1893 | Rex . |
| 1,998,072 | 4/1935 | Blake et al. . |
| 3,170,057 | 2/1965 | Kane et al. .................. 340/815.13 |
| 3,560,968 | 2/1971 | Andersen et al. .............. 340/815.13 |
| 3,754,243 | 8/1973 | Kaneko et al. . |
| 3,927,290 | 12/1975 | Denley . |
| 4,115,673 | 9/1978 | Smith . |
| 4,357,511 | 11/1982 | Tenner et al. . |
| 5,027,103 | 6/1991 | Weiner ............................ 340/426 |

*Primary Examiner*—John K. Peng
*Assistant Examiner*—Edward Lefkowitz
*Attorney, Agent, or Firm*—MacMillan, Sobanski & Todd

[57] ABSTRACT

An electronic vehicle security system includes a valet switch and status indicator light combined into a single unit. The system includes a central controller having a plurality of sensors connected thereto. The sensors are located throughout the vehicle and generate signals to the controller when an intrusion attempt into the vehicle is detected. In response to these signals, the controller automatically activates an alarm device or an anti-theft device to deter the intruder from entering into or operating the vehicle. The system further includes a combined valet switch and status indicator light assembly. The assembly is adapted to be mounted on the dash panel of the vehicle and is connected through a single wiring harness to the central controller.

6 Claims, 1 Drawing Sheet

COMBINED SWITCH AND INDICATOR LIGHT FOR ELECTRONIC VEHICLE SECURITY SYSTEM

This is a continuation of application Ser. No. 07/669,364, filed Mar. 14, 1991, now abandoned.

BACKGROUND OF THE INVENTION

This invention relates in general to electronic vehicle security systems and in particular to an improved system having a valet switch and status indicator light combined into a single unit.

Many different electronically operated security systems are known in the art for deterring the theft of vehicles and other property. A typical security system includes a central controller having a plurality of sensors connected thereto. The sensors are located throughout the vehicle and generate signals to the controller when an intrusion attempt into the vehicle is detected. In response to these signals, the controller automatically activates an alarm device (such as a siren) or an anti-theft device (such as an ignition disable switch) to deter the intruder from entering into or operating the vehicle.

To assist an authorized operator of the vehicle in controlling the operation of the security system, a remote transmitter is usually provided. The transmitter includes one or more manually operable buttons which, when pressed by the operator, cause the transmitter to generate and transmit signals to a receiver portion of the security system controller. The controller is responsive to such transmitted signals for operating the security system to perform various functions as desired, such as arming and disarming the system, locking and unlocking the vehicle doors or trunk, and the like. The signals are coded or transmitted over frequencies which are unique to the transmitter and the receiver portion, thus preventing unauthorized persons from operating the security system.

Most modern security systems are provided with a manually operable disable switch, commonly referred to as a valet switch. The valet switch is usually mounted in a concealed, but relatively easily accessible location within the passenger compartment of the vehicle, such as beneath the dash panel. The valet switch is generally embodied as a single pole, double throw switch and is connected to the central controller. When the valet switch is in one position, the central controller enables the system for normal operation. However, when the valet switch is moved to the opposite position, the central controller disables most or all of the security system functions.

The valet switch is provided to conveniently disable the system when persons other than the owner are using the vehicle (with permission) and the owner does not wish to provide such persons with the transmitter to avoid actuating the alarm. For example, when the vehicle is given to a valet for parking, the system can be easily disabled by the owner so that the valet will not inadvertently trigger the alarm. This is preferable to providing the transmitter to the valet, since the transmitter could be used to alter the programming of the system without the knowledge of the owner.

Most security systems further include a status indicator light which is located within the vehicle so as to be easily visible, both from within the vehicle and from outside by looking through the windows thereof. Typically, the status indicator light is a relatively small light emitting diode (LED) which is mounted on the dash panel of the vehicle. The status indicator light is controlled by the central controller in response to the operating condition of the system. For example, the status indicator light may be used to verify the programming of the system as it is performed. More importantly, however, the status indicator light typically flashes or is similarly operated to advise an owner returning to the vehicle that an intrusion was attempted in his absence.

Known electronic vehicle security systems which include both a valet switch and a status indicator light have provided separate structures for each. This was necessary because the valet switch was preferably concealed from normal visual contact, while the status indicator light was preferably located in an easily visible area. Consequently, separate installations were required for each of these components, along with the separate wiring. Since the labor involved in installing such systems constitutes a major portion of the overall cost to the consumer, it would be desirable to provide a structure wherein both the valet switch and the status indicator light can be installed at the same time. Furthermore, it would be desirable to locate the valet switch in a more accessible location than has been previously done, yet which is not readily obvious to unauthorized persons.

SUMMARY OF THE INVENTION

This invention relates to an improved electronic vehicle security system including a valet switch and status indicator light combined into a single unit. The system includes a central controller having a plurality of sensors connected thereto. The sensors are located throughout the vehicle and generate signals to the controller when an intrusion attempt into the vehicle is detected. In response to these signals, the controller automatically activates an alarm device or an anti-theft device to deter the intruder from entering into or operating the vehicle. The system further includes a combined valet switch and status indicator light assembly. The assembly is adapted to be mounted on the dash panel of the vehicle and is connected through a single wiring harness to the central controller.

It is an object of this invention to provide an improved electronic vehicle security system including a valet switch and status indicator light combined into a single unit.

It is another object of this invention to provide such a combined valet switch and status indicator light assembly which is simple and inexpensive to construct and install.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
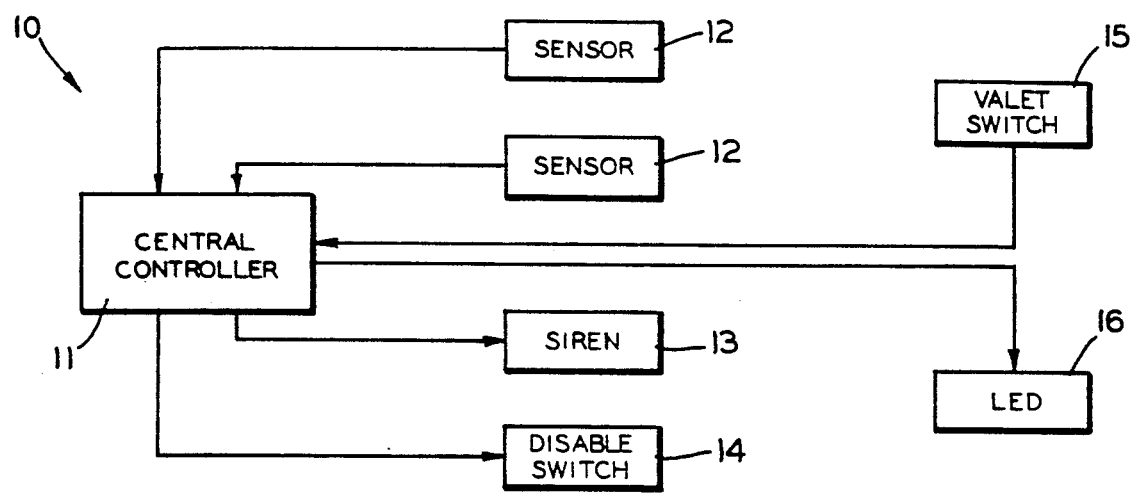
FIG. 1 is a block diagram of a prior art electronic vehicle security system including a separate valet switch and status indicator light.

Referring now to the drawings, there is illustrated in FIG. 1 a block diagram of a prior art electronic security system, indicated generally at 10, which is adapted for use in a vehicle. The system 10 includes a central controller 11, which may be embodied as a conventional microprocessor. A plurality of sensors 12 are connected to the central controller 11. The sensors 12 are mounted at various locations throughout the vehicle and generate electrical signals to the central controller 11 when an intrusion attempt into the vehicle is detected. For example, sensors 12 may be mounted to generate a signal when the doors or the trunk of the vehicle are opened. Also, sensors 12 may be mounted within the passenger compartment of the vehicle to generate a signal when noise or motion is detected therein. In response to these signals, the central controller 11 automatically activates an alarm device (such as a siren 13) or an anti-theft device (such as an ignition disable switch 14) to deter the intruder from entering into or operating the vehicle.

The system 10 further includes a manually operable disable switch, commonly referred to as a valet switch 15. The valet switch 15 is usually mounted in a concealed, but relatively easily accessible location within the passenger compartment of the vehicle, such as beneath the dash panel. The illustrated valet switch 15 is a single pole, double throw switch which is connected to the central controller 11. When the valet switch 15 is in one position, the central controller 11 enables the system 10 for normal operation. However, when the valet switch 15 is moved to the opposite position, the central controller 11 disables most or all of the security system functions, as described above.

The system 10 further includes a status indicator light 16 which is located within the vehicle so as to be easily visible, both from within the vehicle and from outside by looking through the windows thereof. The illustrated status indicator light 16 is a relatively small LED which is mounted on the dash panel of the vehicle. The status indicator light 16 is connected to the central controller 11, which controls the operation thereof in response to the operating condition of the system 10. As mentioned above, the status indicator light 16 may be used to verify the programming of the system 10 as it is performed or to indicate if an intrusion was attempted while the system 10 was armed.

Figure 2:
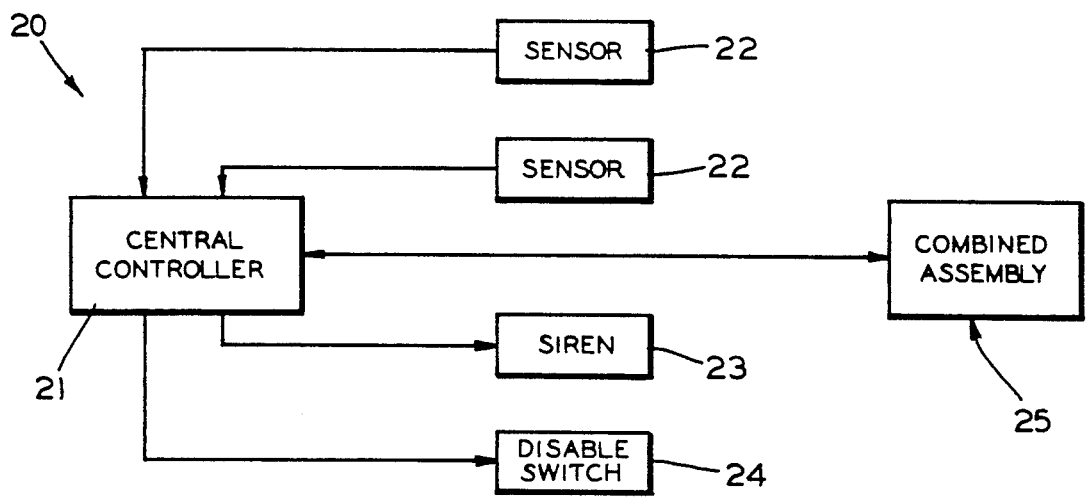
FIG. 2 is a block diagram of an electronic vehicle security system including a combined valet switch and status indicator light assembly in accordance with this invention.

Referring now to FIG. 2, there is illustrated a block diagram of an improved electronic security system, indicated generally at 20, which is also adapted for use in a vehicle. The system 20 includes a central controller 21 having a plurality of sensors 22 connected thereto. The central controller 21 is adapted to selectively operate an alarm device (such as a siren 23) or an anti-theft device (such as an ignition disable switch 24) as described above with respect to FIG. 1. The system 20 further includes a combined valet switch and status indicator light assembly, indicated generally at 25.

Figure 3:
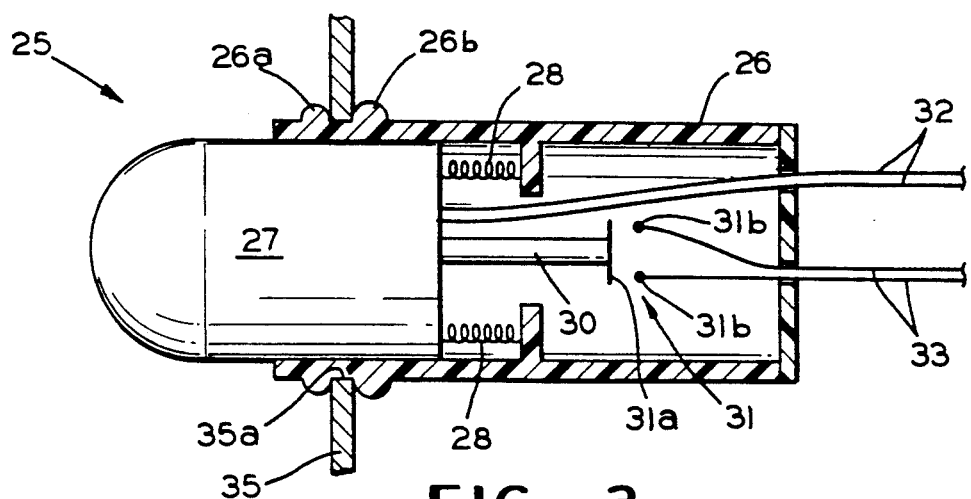
FIG. 3 is a sectional elevational view of the combined valet switch and status indicator light assembly illustrated in FIG. 2 installed in a dash panel of a vehicle.

FIG. 3 schematically illustrates the basic structure of the combined valet switch and status indicator light assembly 25. As shown therein, the assembly 25 includes a generally hollow cylindrical housing 26 having an LED 27 mounted in the forward end thereof. The housing 26 is preferably formed from a rigid, yet somewhat flexible material, such as plastic. The LED 27 is conventional in the art and includes an outer housing which is journalled within the housing 26 for sliding movement. A pair of springs 28 are provided for urging the LED 27 toward the forward end of the housing 26. The housing of the LED 27 is mechanically connected by a link 30 to the movable contact 31a of a single pole, single throw electrical switch, schematically indicated generally at 31. The switch 31 further includes a pair of fixed contacts 31b.

A pair of electrical conductors 32 extend rearwardly from the LED 27 out of the rearward end of the housing 26. Similarly, a pair of electrical conductors 33 extend rearwardly from the fixed contacts 31b out of the rearward end of the housing 26. The conductors 32 and 33 are connected to the central controller 21. The central controller 21 generates signals over the conductors 32 to control the operation of the LED 27, i.e., to regulate the manner in which the LED 27 is illuminated. Those signals are, as mentioned above, generated in response to the operating condition of the system 10.

Normally, the springs 28 urge the LED 27 forwardly within the housing 26. Thus, as shown in FIG. 3, the movable contact 31a is normally not engaged with the fixed contacts 31b of the switch 31. However, an operator of the vehicle can, by applying pressure on the LED 27 with a finger, push the LED 27 rearwardly within the housing 26 such that the movable contact 31a engages the fixed contacts 31b. This movement closes the switch 31, causing an electrical signal to be generated over the conductors 33 to the central controller 21. In this manner, the operator can control the operation of the system 10, much like the separate valet switch provided in prior art systems.

The assembly 25 is releasably secured to a dash panel 35 or similar article in the vehicle. To accomplish this, an aperture 35a is formed through the dash panel 35. The outer diameter of the housing 26 is slightly smaller than the diameter of the aperture 35a. However, the housing 26 is formed having a pair of integral outwardly extending ribs 26a and 26b formed circumferentially thereabout. The outer diameters of the ribs 26a and 26b are larger than the outer diameter of the rest of the housing 26 and the diameter of the aperture 35a. If desired, the outer diameter of the rearward rib 26b may be larger than the outer diameter of the forward rib 26a.

The assembly 25 can be installed in the dash panel 35 by inserting the forward end of the assembly 25 forwardly through the aperture 35a. By applying a sufficient forwardly directed pressure, the housing 26 will be deformed slightly radially inwardly to permit the forward rib 26a to pass through the aperture 35a. By forming the rearward rib 26b larger than the forward rib 26a, the likelihood of pushing both ribs 26a and 26b through the aperture 35a are reduced. The ribs 26a and 26b are spaced apart from one another by an axial distance which is equal to or slightly less than the thickness of the dash panel 35. Thus, the assembly 25 will be retained without movement within the aperture 35a.

The combined valet switch and status indicator light assembly 25 performs the same functions as the separate valet switch and status indicator light of the prior art. However, the assembly 25 is much easier to install than such separate components. Furthermore, the valet switch portion 31 of the assembly 25 is mounted in a location which is readily accessible to the operator of the vehicle, unlike the prior art valet switches. Notwithstanding this, the function of the switch 31 is concealed by the LED 27. An unauthorized person who gains access to the vehicle is not likely to recognize that the manually operable portion of the valet switch is embodied as the LED 27 itself.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A security system for a vehicle comprising:
   sensor means for generating a sensor signal in response to an occurrence of a predetermined condition within the vehicle;
   controller means responsive to said sensor means signal for generating an alarm signal in response thereto;
   security means responsive to said alarm signal for performing a vehicle security function in response thereto; and
   switch means connected to said controller means for selectively generating a disable signal to disable said security means, said switch means including a member which is movable between a first position, wherein said disable signal is generated, and a second position, wherein said disable signal is not generated, said switch means further including a light which is mounted on said member for movement therewith, said light being electrically connected to said controller means and responsive to an operating condition of said controller means for generating a visual indication of the operating condition thereof.

2. The security system defined in claim 1 wherein said sensor means includes a sensor adapted to be disposed within the vehicle for generating said sensor signal.

3. The security system defined in claim 1 wherein said sensor means includes a plurality of sensors adapted to be disposed within the vehicle, each of said sensors being responsive to an occurrence of a different predetermined condition for generating respective sensor signals, said controller means being responsive to any of said sensor signals for generating said alarm signal in response thereto.

4. The security system defined in claim 1 wherein said security means is an alarm device.

5. The security system defined in claim 1 wherein said switch means includes a housing having a light emitting diode slidably mounted, said light emitting diode being movable with said member between said first and second positions.

6. The security system defined in claim 5 further including means for urging said light emitting diode and said member toward said second position such that said disable signal is not generated.

* * * * *